(12) United States Patent
Volmerding

(10) Patent No.: US 10,408,108 B2
(45) Date of Patent: Sep. 10, 2019

(54) SYSTEMS AND METHODS FOR USING LIQUID ANHYDROUS AMMONIA AS A REDUCTANT

(71) Applicant: Cummins Emission Solutions Inc., Columbus, IN (US)

(72) Inventor: Matthew K. Volmerding, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/883,903

(22) Filed: Jan. 30, 2018

(65) Prior Publication Data

US 2019/0234271 A1 Aug. 1, 2019

(51) Int. Cl.
*B01D 53/94* (2006.01)
*F01N 3/20* (2006.01)

(52) U.S. Cl.
CPC ......... *F01N 3/208* (2013.01); *B01D 53/9418* (2013.01); *B01D 53/9495* (2013.01); *F01N 2610/02* (2013.01); *F01N 2610/1406* (2013.01); *F01N 2610/1466* (2013.01)

(58) Field of Classification Search
CPC .......... B01D 53/9418; B01D 2251/206; B01D 2251/2062; B01D 2251/2067; B01D 2257/402; B01D 2257/404; B01D 2258/01; B01D 2259/124; F01N 3/2066; F01N 2260/14; F01N 2570/14; F01N 2610/02; F01N 2610/1406; F01N 2610/146; F01N 2900/1806; F01N 2900/1808
See application file for complete search history.

(56) References Cited

U.S. PATENT DOCUMENTS

| | | | |
|---|---|---|---|
| 6,273,120 B1 * | 8/2001 | Hofmann | B01D 53/8631 137/98 |
| 6,935,103 B2 * | 8/2005 | Binder | F01N 3/2066 60/286 |
| 9,097,164 B2 | 8/2015 | Bauer et al. | |
| 9,353,660 B2 | 5/2016 | Jannot et al. | |
| 2009/0319155 A1 * | 12/2009 | Dyrbusch | F01N 3/0253 701/103 |
| 2013/0263927 A1 * | 10/2013 | Johannessen | F16K 49/00 137/1 |

* cited by examiner

*Primary Examiner* — Timothy C Vanoy
(74) *Attorney, Agent, or Firm* — Foley & Lardner LLP

(57) ABSTRACT

A reductant insertion system for delivering a reductant to an aftertreatment system comprises a reductant storage tank configured to store a liquid reductant. A pressure relief valve is operably coupled to the reductant storage tank. The pressure relief valve is configured to selectively open in response to a reductant gas pressure in the reductant storage tank exceeding a predetermined reductant gas pressure threshold. A reductant insertion assembly is fluidly coupled to the reductant storage tank and configured to deliver the liquid reductant to the aftertreatment system. The reductant insertion assembly comprises a shutoff valve configured to be selectively closed in response to a liquid reductant pressure in the reductant insertion assembly exceeding a liquid reductant pressure threshold, so as to stop delivery of the reductant from the reductant storage tank to the reductant insertion assembly.

25 Claims, 4 Drawing Sheets though only several implementations in accordance with the disclosure and are therefore not to be considered limiting of its scope, the disclosure will be described with additional specificity and detail through use of the accompanying drawings.

SYSTEMS AND METHODS FOR USING LIQUID ANHYDROUS AMMONIA AS A REDUCTANT

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant (e.g., a diesel exhaust fluid such as urea) is injected into the SCR system to provide a source of ammonia and mixed with the exhaust gas to partially reduce the NOx gases. The reduction byproducts of the exhaust gas are then fluidly communicated to the catalyst included in the SCR system to decompose substantially all of the NOx gases into relatively harmless byproducts that are expelled out of the aftertreatment system.

Reductants used in SCR systems generally include a water based liquid such as, for example, an aqueous urea solution or a diesel exhaust fluid (DEF) as the source of ammonia. Such reductants have low ammonia content. For example, a commonly used reductant comprising aqueous urea solution includes 32.5w/w % urea to 67.5w/w % deionized water, but the ammonia content in the reductant is only about 18.5%. Other water based reductants are also prone to freezing at low temperatures, particularly at very low temperatures (e.g., below −11 degrees Celsius) or where the exhaust gas temperature is less than 170 degrees Celsius (e.g., on engine startup). Such reductants also cause reductant deposits to form in components of the aftertreatment system (e.g., in a reductant insertion assembly, hoses, tubes, or the SCR system) or any other surfaces in contact with the reductant. Reductant deposit formation is even higher at low temperatures. Furthermore, such reductants also have a high carbon footprint.

SUMMARY

Embodiments described herein relate generally to systems and methods for using liquid anhydrous ammonia as a reductant in SCR systems, and in particular, to reductant insertion systems that include a reductant storage tank configured to store liquid anhydrous ammonia and a reductant insertion assembly, each having various safety features for maintaining pressure and preventing leak of the liquid anhydrous ammonia.

In a first set of embodiments, a reductant insertion system for delivering a reductant to a SCR system of an aftertreatment system comprises a reductant storage tank configured to store a liquid reductant. A pressure relief valve is operably coupled to the reductant storage tank. The pressure relief valve is configured to selectively open in response to a reductant gas pressure of a reductant gas in the reductant storage tank exceeding a predetermined reductant gas pressure threshold. A reductant insertion assembly is fluidly coupled to the reductant storage tank and configured to deliver the liquid reductant to the SCR system. The reductant insertion assembly comprises a shutoff valve configured to be selectively closed in response to a liquid reductant pressure exceeding a liquid reductant pressure threshold, so as to stop delivery of the liquid reductant from the reductant storage tank to the reductant insertion assembly.

In another set of embodiments, an aftertreatment system for treating an exhaust gas produced by an engine comprises a SCR system. A reductant storage tank is configured to store a liquid reductant. A pressure relief valve is operably coupled to the reductant storage tank and is configured to selectively open in response to a reductant gas pressure of a reductant gas in the reductant storage tank exceeding a predetermined reductant gas pressure threshold. A reductant insertion assembly is fluidly coupled to the reductant storage tank and the SCR system. The reductant insertion assembly comprises a shutoff valve. A controller is communicatively coupled to the reductant insertion assembly. The controller is configured to determine a liquid reductant pressure in the reductant insertion assembly. The controller is configured to selectively close the shutoff valve in response to the liquid reductant pressure in the reductant insertion assembly exceeding a liquid reductant pressure threshold so as to stop a flow of the liquid reductant into the reductant insertion assembly.

In yet another set of embodiments, a method for decomposing constituents of an exhaust gas flowing through an aftertreatment system comprises receiving the exhaust gas by a SCR system included in the aftertreatment system. A liquid reductant is received by a reductant insertion assembly from a reductant storage tank included in the aftertreatment system, the liquid reductant being stored in the reductant storage tank. An amount of liquid reductant to be inserted into the SCR system for optimal decomposition of NOx gases included in the exhaust gas is determined. A dosing valve of the reductant insertion assembly is opened for a predetermined time so as to insert the determined amount of liquid reductant into the SCR system. A liquid reductant pressure in the reductant insertion assembly is determined. A shutoff valve included in the reductant insertion assembly is closed in response to the liquid reductant pressure in the reductant insertion assembly exceeding a liquid reductant pressure threshold so as to stop a flow of the liquid reductant into the reductant insertion assembly.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
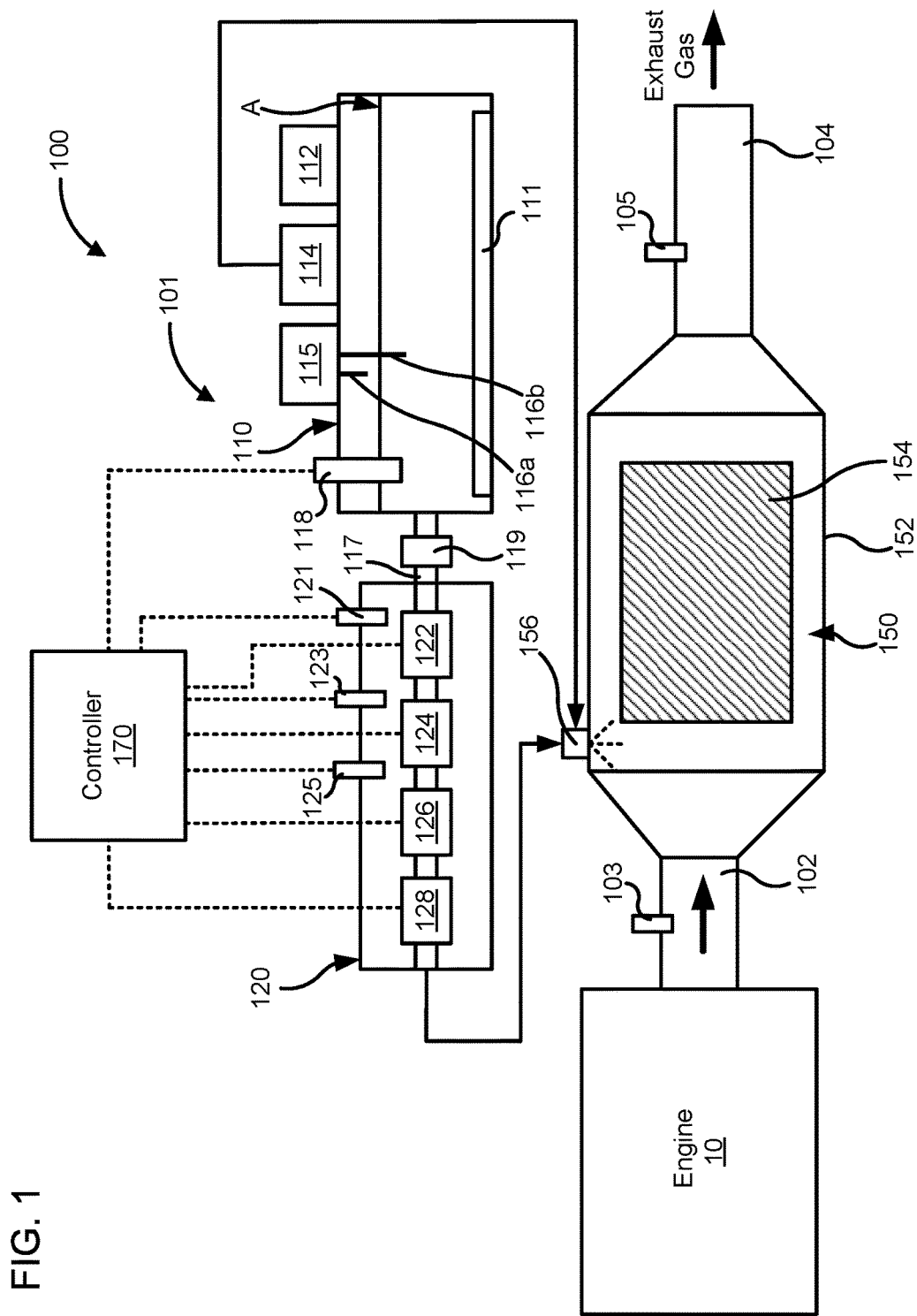
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for using a liquid reductant, such as liquid anhydrous ammonia in SCR systems, and in particular, to reductant insertion systems that include a reductant storage tank configured to store liquid anhydrous ammonia and a reductant insertion assembly, each having various safety features for maintaining pressure and preventing leak of the liquid anhydrous ammonia.

Reductants used in SCR systems generally include a water based liquid such as, for example, an aqueous urea solution or a diesel exhaust fluid (DEF) as the source of ammonia. Such reductants have low ammonia content. For example, a commonly used reductant comprising aqueous urea solution includes 32.5w/w % urea to 67.5w/w % deionized water, but the ammonia content in the reductant is only about 18.5%. Other water based reductants are also prone to freezing at low temperatures, particularly at very low temperatures (e.g., below −11 degrees Celsius) or where the exhaust gas temperature is less than 170 degrees Celsius (e.g., on engine startup). Such reductants also cause reductant deposits to form in components of the aftertreatment system (e.g., in a reductant insertion assembly, hoses, tubes, or the SCR system) or any other surfaces in contact with the reductant. Reductant deposit formation is even higher at low temperatures. Furthermore, such reductants also have a high carbon footprint.

Other conventional methods provide for a reductant including ammonia, ammonia carbonate and water, but suffers from freezing at low temperatures, reductant deposit formation and lower ammonia density. Still other conventional systems use strontium ammine chloride as an ammonia gas storage source, and ammonia gas is provided as the reductant. While this provides a higher content of ammonia than aqueous urea solutions, operation at low temperatures and formation of ammonium nitrate deposits remains a problem. Furthermore, refilling and re-charging of such reductant insertion systems needs special infrastructure which is not available.

Various embodiments of the systems and methods for using a liquid reductant having a low boiling point, such as liquid anhydrous ammonia, described herein may provide benefits including, for example: (1) providing a reductant rich source of ammonia in the form of liquid anhydrous ammonia having close to 100% reductant density; (2) allowing operation at low temperatures because anhydrous ammonia has a boiling point of −33.33 degrees Celsius and freezing point of −77 degrees Celsius; (3) reducing risk of deposit formation by eliminating secondary byproduct formation chemical pathways such as those which occur in conventional urea based reductants; (4) eliminating freezing issues and reducing startup time concerns; and (5) reducing weight, space and energy needs for transportation of reductant.

FIG. 1 is a schematic illustration of an aftertreatment system 100, according to an embodiment. The aftertreatment system 100 is configured to receive an exhaust gas from an engine 10 (e.g., a diesel engine, a gasoline engine, a natural gas engine, a dual fuel engine, a biodiesel engine, an E-85 engine, or any other suitable engine) and reduce constituents of the exhaust gas such as, for example, NOx gases, CO, hydrocarbons, etc. The aftertreatment system 100 comprises a reductant insertion system 101, an SCR system 150, and a controller 170.

The SCR system 150 comprises a housing 152 defining an internal volume within which at least one catalyst 154 formulated to decompose constituents of an exhaust flowing therethrough is positioned. The housing 152 may be formed from a rigid, heat-resistant and corrosion-resistant material, for example stainless steel, iron, aluminum, metals, ceramics, or any other suitable material. The housing 152 may have any suitable cross-section, for example circular, square, rectangular, oval, elliptical, polygonal, or any other suitable shape.

In some embodiments, the SCR system 150 may comprise a selective catalytic reduction filter (SCRF) system, or any other aftertreatment component configured to decompose constituents of the exhaust gas (e.g., NOx gases such as such nitrous oxide, nitric oxide, nitrogen dioxide, etc.), flowing through the aftertreatment system 100 in the presence of a reductant, as described herein.

The catalyst 154 is formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the catalyst 154 such that any NOx gases included in the exhaust gas are further reduced to yield an exhaust gas which is substantially free of NOx gases.

Although FIG. 1 shows only the catalyst 154 positioned within the internal volume defined by the housing 152, in other embodiments, a plurality of aftertreatment components may be positioned within the internal volume defined by the housing 152 in addition to the catalyst 154. Such aftertreatment components may comprise, for example, filters (e.g., particulate matter filters, catalyzed filters, etc.), oxidation catalysts (e.g., carbon monoxide, hydrocarbons and/or ammonia oxidation catalysts), mixers, baffle plates, or any other suitable aftertreatment component.

An inlet conduit 102 is fluidly coupled to an inlet of the housing 152 and structured to receive exhaust gas from the engine 10 and communicate the exhaust gas to the internal volume defined by the housing 152. Furthermore, an outlet conduit 104 may be coupled to an outlet of the housing 152 and structured to expel treated exhaust gas into the environment.

A first sensor 103 may be positioned in the inlet conduit 102. The first sensor 103 may comprise a NOx sensor configured to measure an amount of NOx gases included in the exhaust gas flowing into the SCR system 150. The first sensor 103 may include a physical NOx sensor or a virtual NOx sensor. In various embodiments, a temperature sensor, a pressure sensor, particulate matter sensor, hydrocarbon sensor, an oxygen sensor carbon dioxide sensor, or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second NOx sensor configured to determine an amount of NOx gases expelled into the environment after passing through the SCR system 150. In other embodiments, the second sensor 105 may comprise an ammonia oxide (AMOx) sensor configured to measure an amount of ammonia in the exhaust gas flowing out of the SCR system 150 (i.e., determine the ammonia slip). This may be used as a measure for determining a catalytic efficiency of the SCR system 150, for adjusting an amount of reductant to be inserted into the SCR system 150, and/or adjusting a temperature of the SCR system 150 so as to allow the SCR system 150 to effectively use the ammonia for catalytic decomposition of the NOx gases included in the exhaust gas flowing therethrough.

A reductant insertion port 156 may be provided on a sidewall of the housing 152 and structured to allow insertion of a reductant therethrough into the internal volume defined by the housing 152. The reductant insertion port 156 may be positioned upstream of the catalyst 154 (e.g., to allow reductant to be inserted into the exhaust gas upstream of the catalyst 154) or over the catalyst 154 (e.g., to allow reductant to be inserted directly on the catalyst 154). In other embodiments, the reductant insertion port 156 may be disposed on the inlet conduit 102 and configured to insert the reductant into the inlet conduit 102 upstream of the SCR system 150. In such embodiments, mixers, baffles, vanes or other structures may be positioned in the inlet conduit 102 so as to facilitate mixing of the reductant with the exhaust gas.

The reductant insertion system 101 is configured to store and provide a liquid reductant to the SCR system 150. The liquid reductant may have a boiling point of less than −11 degrees Celsius. In particular embodiments, the liquid reductant comprises liquid anhydrous ammonia. It should be appreciated that while the reductant insertion system 101 is described with regards to liquid anhydrous ammonia, all other suitable liquid reductants (e.g., those having a boiling point of less than −11 degrees Celsius) should be considered to fall within the scope of the present disclosure.

The reductant insertion system 101 comprises a reductant storage tank 110 and a reductant insertion assembly 120. The reductant storage tank 110 is structured to store liquid anhydrous ammonia. The reductant storage tank 110 may include a cylindrical tank (e.g., a pressure vessel) made of a strong material, for example, metals such as stainless steel (e.g., quenched or tempered steel, Type I metal, Type V full composite metal, etc.). In some embodiments, the reductant storage tank 110 may be structured to withstand a pressure of at least 250 psi, for example, for safety purposes.

In some embodiments, the reductant storage tank 110 may be painted with a light color (e.g., silver or white) so as to reduce radiant heat absorption by the reductant storage tank 110 (e.g., by reflecting the radiant heat) and prevent heating of the reductant storage tank 110 and thereby, the liquid anhydrous ammonia contained therewithin.

The reductant storage tank 110 may be configured to be filled to a level as shown by the arrow A in FIG. 1, such that a volume of liquid anhydrous ammonia is less than 85% of a total volume of the reductant storage tank 110 (e.g., for safety purposes). For example, 15% of the total volume of the reductant storage tank 110 may be filled with a reductant gas, for example, ammonia gas. The ammonia gas may exert a partial pressure on the liquid anhydrous ammonia which equalizes a partial pressure of the liquid anhydrous ammonia. Since the total volume of the reductant storage tank 110 may not be filled with the liquid anhydrous ammonia, the reductant storage tank 110 may have a total volume which is 1.18× the desired maximum amount of the liquid anhydrous ammonia to be stored in the reductant storage tank 110.

A refill valve 115 may be operably coupled to the reductant storage tank 110. The refill valve 115 may comprise a vapor line 116a and a liquid line 116b. The liquid line 116b may be configured to deliver liquid anhydrous ammonia gas into the reductant storage tank 110. Furthermore, the vapor line 116a may be configured to at least one of deliver ammonia gas into or allow the ammonia gas to exit from the reductant storage tank 110 so as to equalize a partial pressure of the ammonia gas a partial pressure of the liquid anhydrous ammonia in the reductant storage tank 110. For example, the vapor line 116a and the liquid line 116b may simultaneously or sequentially deliver ammonia gas and liquid anhydrous ammonia, respectively into the reductant storage tank 110 (e.g., during a refill operation) so as to fill the liquid anhydrous ammonia to less than 85% of the total volume of the reductant storage tank 110, while filling the remaining volume with ammonia gas. In other embodiments, the vapor line 116a may allow exit of ammonia gas already present within the reductant storage tank 110 as the liquid anhydrous ammonia is being delivered into the reductant storage tank 110, so as to prevent venting of the ammonia gas to the environment. In this manner, the refill valve 115 may allow balancing of the partial pressures of the ammonia gas and the liquid anhydrous ammonia in the reductant storage tank 110.

A liquid level sensor 112 (e.g., a level gage) may be operably coupled to the reductant storage tank 110 and configured to determine an amount of liquid anhydrous ammonia contained in the reductant storage tank 110. An ammonia quality sensor 118 may also be operably coupled to the reductant storage tank 110 and configured to measure a quality of the liquid anhydrous ammonia (e.g., indicate presence of air bubbles or contaminants in the liquid anhydrous ammonia).

In particular embodiments, the reductant storage tank 110 may comprise self-sealing features for sealing leaks, so as to prevent leaking of the liquid anhydrous ammonia and ammonia gas therefrom. Such features may include, for example, layers of rubber (e.g., vulcanized rubber or untreated natural rubber) or reinforced fabric positioned within or on an outer surface of the reductant storage tank 110. In the event of a leak, the self-sealing features may be configured to absorb the liquid anhydrous ammonia or ammonia gas and swell, thereby sealing the leak. In various embodiments, the reductant storage tank 110 may be mounted via a frame on a mounting structure (e.g., a vehicle or equipment that includes the aftertreatment system 100). The frame may be structured to resist a G force of up to 8 Gs and provide sufficient road clearance to the reductant storage tank 110 (e.g., to protect the reductant storage tank 110 from damage). In particular embodiments, the reductant insertion system 101 may also include a conventional reductant storage tank configured to hold a conventional reductant (e.g., an aqueous urea solution such as DEF). In such embodiments, the reductant insertion system 101 may also be configured to selectively insert the conventional reductant and/or the liquid anhydrous ammonia into the SCR system 150.

In some embodiments, the reductant storage tank 110 may comprise a bladder 111 positioned within an internal volume thereof. The bladder 111 may be configured to be selectively filled with a fluid (e.g., air or water provided by a pump) so as to expand causing the liquid anhydrous ammonia to be communicated out of the reductant storage tank 110. In other embodiments, the liquid anhydrous ammonia may be filled in the bladder 111, and a pressure of ammonia around the bladder 111 may be increased so as to compress the bladder 111 and communicate the liquid anhydrous ammonia out of the reductant storage tank 110.

A pressure relief valve 114 is operably coupled to the reductant storage tank 110. The pressure relief valve 114 is configured to selectively open in response to an ammonia gas pressure in the reductant storage tank 110 exceeding a predetermined ammonia gas pressure threshold. The pressure relief valve 114 may include, for example, a check valve, a spring operated valve, a set pressure valve, a snap-acting safety valve, a pilot operated relief valve, a modulating valve or any other suitable pressure relief valve, and configured to open when the ammonia gas pressure exceeds the predetermined ammonia gas pressure threshold so as to prevent pressure buildup in the reductant storage tank 110. The pressure relief valve 114 may be mounted on a top sidewall (e.g., a roof) of the reductant storage tank 110) and may include shields (e.g., to prevent splashing to any liquid anhydrous ammonia which may escape through the pressure relief valve 114) and/or conduits to route released ammonia gas in response to the pressure relief valve 114 opening. In particular embodiments, the predetermined ammonia gas pressure threshold may be in a range of 75% to 85% of a rated pressure of the reductant storage tank 110 (e.g., 75%, 76%, 77%, 78%, 79%, 80%, 81%, 82%, 83%, 84% or 85% of the rated pressure inclusive of all ranges and values therebetween). In other words the pressure relief valve 114 may be configured to open if an ammonia gas pressure in the reductant storage tank 110 is in the range of 75% to 85% of the rated pressure of the reductant storage tank 110.

In some embodiments, the pressure relief valve 114 may be configured to vent released ammonia gas safely into the environment. In other embodiments, the pressure relief valve 114 may be fluidly coupled to the SCR system 150 (e.g., the reductant insertion port 156 as shown in FIG. 1). In such embodiments, the ammonia gas released from the reductant storage tank 110 due to opening of the pressure relief valve 114 may be inserted into the SCR system 150. The released ammonia gas may be used in the decomposition of NOx gases by the SCR system 150, or may be decomposed downstream of the SCR system 150, for example, by an ammonia oxide (AMOx) catalyst positioned downstream of the catalyst 154.

The reductant insertion assembly 120 is fluidly coupled to the reductant storage tank 110 via a reductant delivery line 117. The reductant delivery line 117 may be made from a corrosion resistant material (e.g., nylon or stainless steel hose), and may have a thickness configured to withstand a pressure and/or mass of the liquid anhydrous ammonia being communicated therethrough from the reductant storage tank 110 to the reductant insertion assembly 120. In particular embodiments, the reductant delivery line 117 may have dimensions configured to limit a liquid anhydrous ammonia mass within the reductant delivery line to less than 300 grams. For example, the reductant delivery line 117 may have a length and/or an internal diameter configured to limit the mass of liquid anhydrous ammonia flowing therethrough or contained therewithin to less than 300 grams, for example, for safety reasons (e.g., to limit an amount of the liquid anhydrous ammonia which may leak out of the reductant delivery line 117 if the reductant delivery line ruptures or leaks).

A manual shutoff valve 119 maybe positioned between the reductant storage tank 110 and the reductant insertion assembly 120 (e.g., in the reductant delivery line 117). The manual shutoff valve 119 is configured to be selectively closed so as to prevent a flow of liquid anhydrous ammonia to the reductant insertion assembly 120 from the reductant storage tank 110. The manual shutoff valve 119 may include, for example, a gate valve, a ball valve, a butterfly valve, a globe valve, a diaphragm valve or any other suitable manually operated valve. The manual shutoff valve 119 may be open during normal operation and may be selectively closed by a user (e.g., an operator of a vehicle or equipment including the aftertreatment system 100) if a liquid anhydrous ammonia pressure in the reductant storage tank 110 and/or the reductant insertion assembly 120 exceeds a predetermined liquid anhydrous ammonia pressured threshold, a liquid anhydrous ammonia level in the reductant storage tank 110 drops below a level threshold, and/or a leak is detected in the reductant storage tank 110 and/or the reductant insertion assembly 120.

The reductant insertion assembly 120 is configured to deliver the liquid anhydrous ammonia to the SCR system 150 of the aftertreatment system 100 The reductant insertion assembly 120 comprises a shutoff valve 122 configured to be selectively closed in response to a liquid ammonia pressure of the liquid anhydrous ammonia exceeding a liquid ammonia pressure threshold, so as to stop delivery of the liquid anhydrous ammonia from the reductant storage tank 110 to the reductant insertion assembly 120. In particular embodiments, the shutoff valve 122 may comprise an electric shutoff valve (e.g., an electrohydraulic actuated shutoff valve, an electric axial valve, an electric ball valve or any other suitable electric shutoff valve) which may respond to a remote signal to move between an open and closed position (e.g., in response to a signal from the controller 170). Closing of the shutoff valve 122 when the liquid anhydrous ammonia pressure exceeds the liquid anhydrous ammonia pressure threshold (e.g., a maximum rated pressure of the reductant insertion assembly 120) stops flow of liquid anhydrous ammonia into the reductant insertion assembly 120. The shutoff valve 122 may be opened once the liquid ammonia pressure in the reductant insertion assembly 120 drops below the liquid ammonia pressure threshold. In other embodiments, the shutoff valve 122 may be selectively opened or closed so as to control a pressure and/or flow rate of the liquid anhydrous ammonia into the reductant insertion assembly 120.

In some embodiments, the reductant insertion assembly 120 may also comprise a check valve 124 such as, for example, a spring operated valve, a set pressure valve, a snap-acting safety valve, a pilot operated relief valve, a modulating valve or any other suitable check valve. The check valve 124 is configured to be selectively opened in response to an ammonia gas pressure in the reductant insertion assembly 120 exceeding an ammonia gas pressure threshold. Expanding further, a portion of the ammonia gas present in the reductant storage tank 110 may also be communicated into the reductant insertion assembly 120, and/or the liquid anhydrous ammonia present in the reductant insertion assembly 120 may evaporate (e.g., due to increase in ambient temperatures or decrease in pressure) leading to an ammonia gas pressure buildup in the reductant insertion assembly 120.

Once the ammonia gas pressure reaches the ammonia gas pressure threshold, the check valve 124 may open so as to vent a portion of the ammonia gas and reduce the ammonia gas pressure in the reductant insertion assembly 120. In some embodiments, the check valve 124 may comprise a self-activating valve (e.g., a spring load valve which automatically opens once the ammonia gas pressure reaches the ammonia gas pressure threshold). In other embodiments, the check valve 124 may comprise an electronic check valve configured to open in response to an electric signal (e.g., from the controller 170).

In some embodiments, the reductant insertion assembly 120 may further comprise an excess flow valve 126 configured to be selectively opened in response to a flow rate of the liquid anhydrous ammonia into the reductant insertion assembly 120 exceeding a predetermined flow rate threshold. The excess flow valve 126 may include an orifice valve, a gate valve, a ball valve, a globe valve, a diaphragm valve, or any other suitable flow control valve. In particular embodiments, the excess flow valve 126 may comprise an electric excess flow valve configured to be selectively opened responsive to an electric signal (e.g., from the controller 170) so as to redirect an excess portion of the liquid anhydrous ammonia out of the reductant insertion assembly 120 and maintain a flow rate of the liquid anhydrous ammonia within the reductant insertion assembly 120. In various embodiments, the reductant insertion system 101 may also include a return line fluidly coupling the reductant insertion assembly 120 to the reductant storage tank 110. The return line may be configured to return the excess portion of the liquid anhydrous ammonia from the reductant insertion assembly 120 back to the reductant storage tank 110.

In other embodiments, the reductant insertion assembly 120 may also comprise a dosing valve 128 configured to be selectively opened so as to insert a predetermined amount of the liquid anhydrous ammonia into the SCR system 150. The dosing valve 128 may comprise any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve, or any other suitable valve. The dosing valve 128 may be configured to selectively open responsive to an electric signal so as to insert a predetermined amount of the liquid anhydrous ammonia at the desired pressure and/or flow rate into the SCR system 150 or upstream thereof.

The controller 170 is communicatively coupled to the reductant insertion assembly 120 and configured to control an operation thereof. In some embodiments, the controller 170 may also be communicatively coupled to the first sensor 103 and the second sensor 105. The controller 170 may be configured to receive and interpret a first sensor signal from the first sensor 103 (e.g., a first NOx sensor) and/or a second sensor signal from the second sensor 105 (e.g., the second NOx sensor) so as to determine various parameters of the exhaust gas (e.g., amount of NOx gases in the exhaust gas, exhaust gas temperature, exhaust gas flow rate, etc.).

In particular embodiments, the controller 170 may be communicatively coupled to the ammonia quality sensor 118 and configured to receive an ammonia quality signal (e.g., a current or voltage) therefrom, indicative of the ammonia quality. The controller 170 may also be coupled to the dosing valve 128 of the reductant insertion assembly 120. The controller 170 may be configured to determine an amount of liquid anhydrous ammonia to be inserted into the SCR system 150 for optimal decomposition of NOx gases included in the exhaust gas (e.g., based on an exhaust gas flow rate, an exhaust gas temperature, an engine speed of the engine 10, amount of NOx gases included in the exhaust gas, the ammonia quality, etc.). The controller 170 may be configured to open the dosing valve 128 for a predetermined time so as to insert the determined amount of liquid anhydrous ammonia into the SCR system 150 at a predetermined pressure and/or flow rate.

In particular embodiments, the aftertreatment system 100 may also include an infrared (IR) ammonia storage measurement system operably coupled to the SCR system 150 (e.g., the catalyst 154) and configured to determine an amount of stored ammonia in the catalyst 154. In such embodiments, the controller 170 may also be operably coupled to the IR measurement system and receive a stored ammonia signal therefrom. The controller 170 may be configure to interpret the stored ammonia signal to determine an amount of the stored ammonia in the catalyst 154, and additionally, or alternatively use the determined amount of the stored ammonia to determine the amount of the liquid anhydrous ammonia to be inserted into the SCR system 150.

The controller 170 may be configured determine a liquid anhydrous ammonia pressure in the reductant insertion assembly 120. For example, the reductant insertion assembly 120 may comprise a liquid ammonia pressure sensor 121 coupled thereto and configured to determine a liquid anhydrous ammonia pressure. The controller 170 may be communicatively coupled to the liquid ammonia pressure sensor 121 and configured to receive a liquid ammonia pressure signal therefrom. The controller 170 may interpret the liquid ammonia pressure signal so as to determine the liquid ammonia pressure. The controller 170 may also be coupled to the shutoff valve 122 (e.g., an electric shutoff valve) and configured to generate a shutoff valve signal in response to the liquid ammonia pressure in the reductant insertion assembly 120 exceeding a liquid ammonia pressure threshold. The shutoff valve signal may be configured to selectively close the shutoff valve 122 so as to stop a flow of the liquid anhydrous ammonia into the reductant insertion assembly 120.

In some embodiments, the controller 170 may also be communicatively coupled to the check valve 124. The controller 170 may be configured to determine the ammonia gas pressure in the reductant insertion assembly 120, and selectively open the check valve 124 in response to the ammonia gas pressure exceeding the ammonia gas pressure threshold. For example, the reductant insertion assembly 120 may comprise an ammonia gas pressure sensor 123 coupled thereto and configured to determine the ammonia gas pressure. The controller 170 may be communicatively coupled to the ammonia gas pressure sensor 123 and configured to receive an ammonia gas pressure signal therefrom. The controller 170 may interpret the ammonia gas pressure signal so as to determine the ammonia gas pressure. In response to determining that the ammonia gas pressure in the reductant insertion assembly 120 exceeds the ammonia gas pressure threshold, the controller 170 may generate a check valve signal configured to selectively open the check valve 124 so as to vent at least a portion of the ammonia gas and reduce ammonia gas pressure in reductant insertion assembly 120.

In still other embodiments, the controller 170 may also be communicatively coupled to the excess flow valve 126. The controller 170 may be configured to determine the flow rate of the liquid anhydrous ammonia flowing into the reductant insertion assembly 120, and selectively open the excess flow valve 126 in response to the flow rate and/or pressure of the liquid anhydrous ammonia exceeding the flow rate threshold. For example, the reductant insertion assembly 120 may comprise a flow rate sensor 125 coupled thereto and configured to determine the flow rate of the liquid anhydrous ammonia flowing into the reductant insertion assembly 120. The controller 170 may be communicatively coupled to the flow rate sensor 125 and configured to receive a flow rate signal therefrom. The controller 170 may interpret the flow rate signal so as to determine the flow rate of the liquid anhydrous ammonia. In response to determining that the flow rate exceeds the flow rate threshold, the controller 170 may generate an excess flow valve signal configured to selectively open the excess flow valve 126 so as to redirect a portion of the liquid anhydrous ammonia out of the reductant insertion assembly 120 (e.g., back to the reductant storage tank 110) and reduce a flow rate and/or pressure of the liquid anhydrous ammonia in the reductant insertion assembly 120.

The controller 170 may be operably coupled to the first sensor 103, the second sensor 105 and various components of the reductant insertion assembly 120 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

Figure 2:
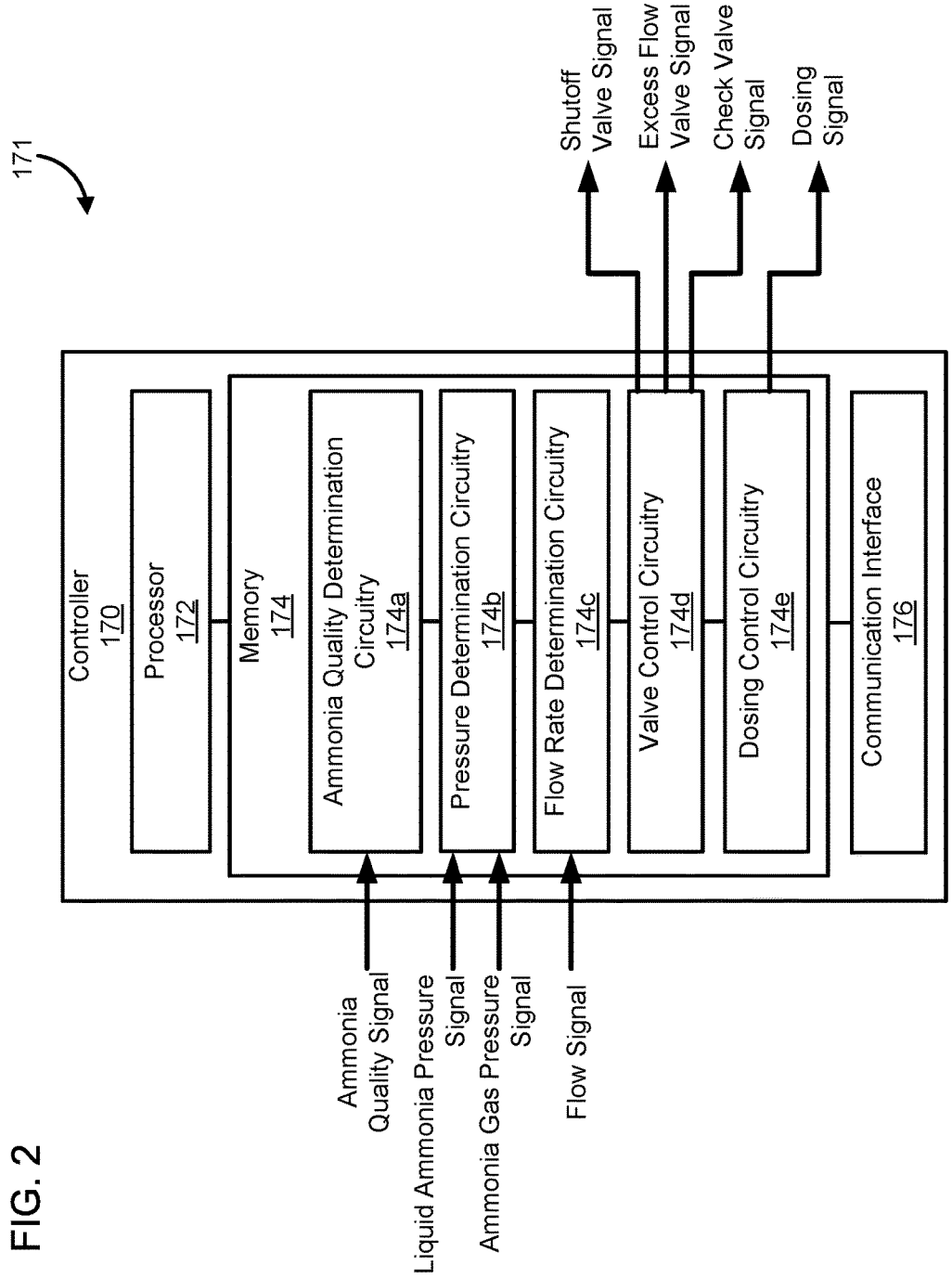
FIG. 2 is a schematic block diagram of an embodiment of a control circuitry that may be included in the aftertreatment system of FIG. 1.

In particular embodiments, the controller 170 can be included in a control circuitry. For example, FIG. 2 is a schematic block diagram of a control circuitry 171 that comprises the controller 170, according to an embodiment. The controller 170 comprises a processor 172, a memory 174, or any other computer readable medium, and a communication interface 176. Furthermore, the controller 170 may include an ammonia quality determination circuitry 174a, a pressure determination circuitry 174b, a flow rate determination circuitry 174c, a valve control circuitry 174d and a dosing control circuitry 174e. It should be understood that the controller 170 shows only one embodiment of the controller 170 and any other controller capable of performing the operations described herein can be used.

The processor 172 may comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174. The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the ammonia quality determination circuitry 174a, the pressure determination circuitry 174b, the flow rate determination circuitry 174c, the valve control circuitry 174d and the dosing control circuitry 174e are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the ammonia quality determination circuitry 174a, the pressure determination circuitry 174b, the flow rate determination circuitry 174c, the valve control circuitry 174d and the dosing control circuitry 174e are embodied as hardware units, such as electronic control units. As such, the ammonia quality determination circuitry 174a, the pressure determination circuitry 174b, the flow rate determination circuitry 174c, the valve control circuitry 174d and the dosing control circuitry 174e may be embodied as one or more circuitry components including, but not limited to, processing circuitry, network interfaces, peripheral devices, input devices, output devices, sensors, etc.

In some embodiments, the ammonia quality determination circuitry 174a, the pressure determination circuitry 174b, the flow rate determination circuitry 174c, the valve control circuitry 174d and the dosing control circuitry 174e may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the ammonia quality determination circuitry 174a, the pressure determination circuitry 174b, the flow rate determination circuitry 174c, the valve control circuitry 174d and the dosing control circuitry 174e may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the ammonia quality determination circuitry 174a, the pressure determination circuitry 174b, the flow rate determination circuitry 174c, the valve control circuitry 174d and the dosing control circuitry 174e may also include programmable hardware devices such as field programmable gate arrays, programmable array logic, programmable logic devices or the like. In this regard, the ammonia quality determination circuitry 174a, the pressure determination circuitry 174b, the flow rate determination circuitry 174c, the valve control circuitry 174d and the dosing control circuitry 174e may include one or more memory devices for storing instructions that are executable by the processor(s) of the ammonia quality determination circuitry 174a, the pressure determination circuitry 174b, the flow rate determination circuitry 174c, the valve control circuitry 174d and the dosing control circuitry 174e. The one or more memory devices and processor(s) may have the same definition as provided herein with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the ammonia quality determination circuitry 174a, the pressure determination circuitry 174b, the flow rate determination circuitry 174c, the valve control circuitry 174d and the dosing control circuitry 174e. Thus, the depicted configuration represents the aforementioned arrangement where the ammonia quality determination circuitry 174a, the pressure determination circuitry 174b, the flow rate determination circuitry 174c, the valve control circuitry 174d and the dosing control circuitry 174e are embodied as machine or computer-readable media. However, as mentioned above, this illustration is not meant to be limiting as the present disclosure contemplates other embodiments such as the aforementioned embodiment where the ammonia quality determination circuitry 174a, the pressure determination circuitry 174b, the flow rate determination circuitry 174c, the valve control circuitry 174d and the dosing control circuitry 174e, or at least one circuit of the ammonia quality determination circuitry 174a, the pressure determination circuitry 174b, the flow rate determination circuitry 174c, the valve control circuitry 174d and the dosing control circuitry 174e are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the ammonia quality determination circuitry 174a, the pressure determination circuitry 174b, the flow rate determination circuitry 174c, the valve control circuitry 174d and the dosing control circuitry 174e) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the ammonia quality sensor 118, the liquid ammonia pressure sensor 121, the ammonia gas pressure sensor 123, the flow rate sensor 125, various components of the reductant insertion assembly 120 or another controller (e.g., an engine control unit). The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The ammonia quality determination circuitry 174a is configured to receive the ammonia quality signal from the ammonia quality sensor 118, which is indicative of a quality of the liquid anhydrous ammonia. The ammonia quality determination circuitry 174a may be configured to interpret the ammonia quality signal and determine the quality of the liquid anhydrous ammonia therefrom.

The pressure determination circuitry 174b may be configured to receive a liquid ammonia pressure signal from the liquid ammonia pressure sensor 121 and determine the liquid anhydrous ammonia pressure therefrom. Furthermore, the pressure determination circuitry 174b may be configured to receive an ammonia gas pressure signal from the ammonia gas pressure sensor 123 and determine the ammonia gas pressure therefrom. The flow rate determination circuitry 174c may be configured to receive a flow rate signal from the flow rate sensor 125 and determine a flow rate of the liquid anhydrous ammonia flowing through the reductant insertion assembly 120.

The valve control circuitry 174d may be configured to control the operation of the various valves included in the reductant insertion assembly 120. For example, the valve control circuitry 174d may be configured to generate a shutoff valve signal in response to the liquid ammonia pressure in the reductant insertion assembly 120 exceeding a liquid ammonia pressure threshold (e.g., determined by the pressure determination circuitry 174b). The shutoff valve signal may be configured to selectively close the shutoff valve 122 so as to stop a flow of the liquid anhydrous ammonia into the reductant insertion assembly 120 from the reductant storage tank 110.

The valve control circuitry 174d may also be configured to generate a check valve signal in response to the pressure determination circuitry 174b determining that the ammonia gas pressure in the reductant insertion assembly 120 exceeds the ammonia gas pressure threshold. The check valve signal may be configured to selectively open the check valve 124 so as to vent the ammonia gas and reduce ammonia gas pressure in the reductant insertion assembly 120. Furthermore, the valve control circuitry 174d may be configured to generate an excess flow valve signal in response to the flow rate determination circuitry 174c determining that the flow rate of the liquid anhydrous ammonia exceeds the flow rate threshold. The check valve signal may be configured to selectively open the excess flow valve 126 so as to redirect a portion of the liquid anhydrous ammonia out of the reductant insertion assembly 120 (e.g., back to the reductant storage tank 110) and reduce a flow rate and/or pressure of the liquid anhydrous ammonia in the reductant insertion assembly 120.

The dosing control circuitry 174c is configured to generate a dosing signal configured to control an operation of the dosing valve 128. For example, the dosing control circuitry 174e may be configured to determine an amount of liquid anhydrous ammonia to be inserted into the SCR system 150 for optimal decomposition of NOx gases included in the exhaust gas (e.g., based on an exhaust gas flow rate, an exhaust gas temperature, an engine speed of the engine 10, amount of NOx gases included in the exhaust gas, the ammonia quality, etc.). The dosing signal may be configured to open the dosing valve 128 for a predetermined time so as to insert the determined amount of liquid anhydrous ammonia into the SCR system 150 at a predetermined pressure and/or flow rate.

Figure 3:
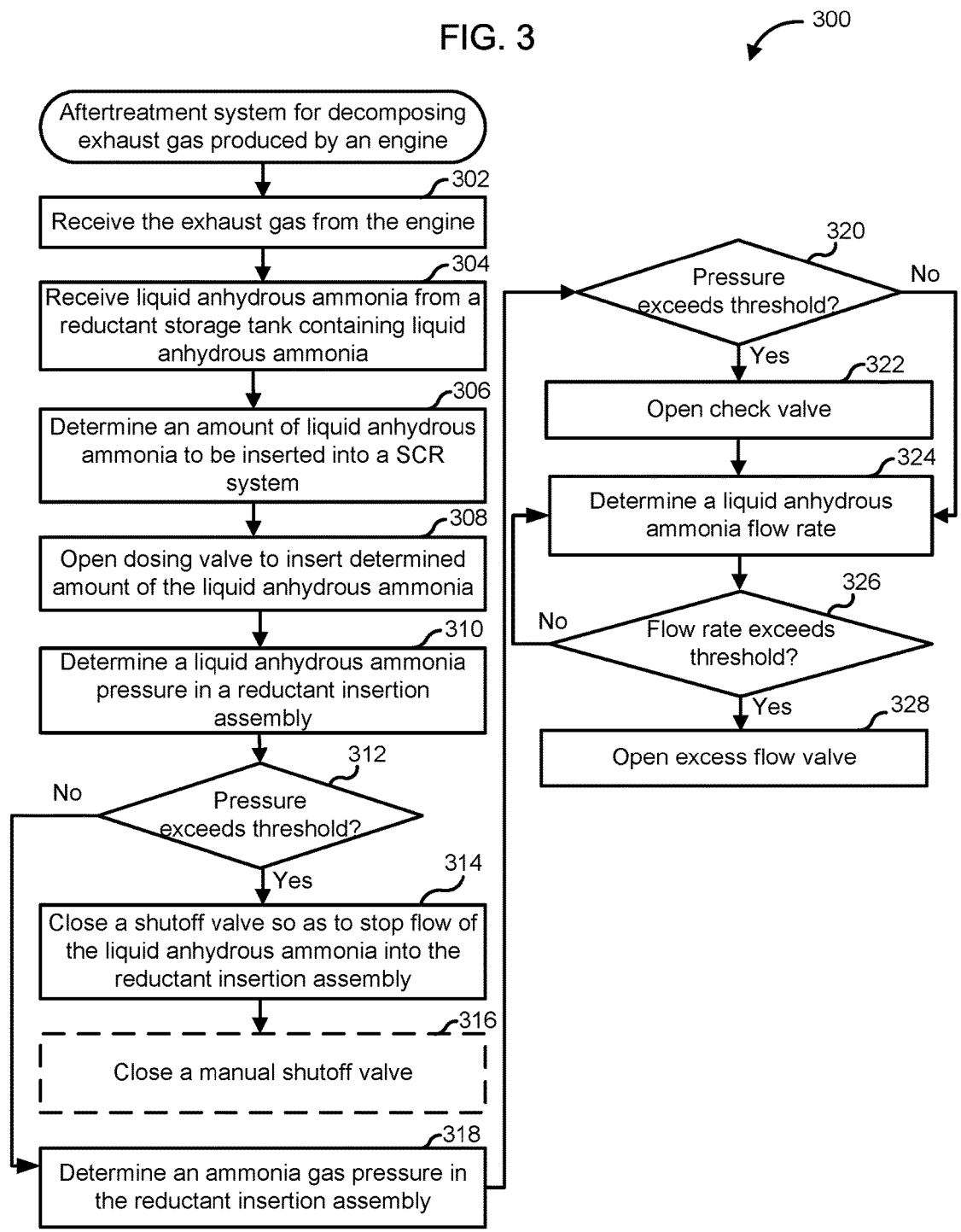
FIG. 3 is a schematic block diagram of an example method for storing liquid anhydrous ammonia in a reductant storage tank and inserting liquid anhydrous ammonia into a SCR system, according to an embodiment.

FIG. 3 is a schematic flow diagram of an example method 300 for using a liquid reductant such as, for example, liquid anhydrous ammonia as the reductant for an exhaust gas flowing through an aftertreatment system (e.g., the aftertreatment system 100), according to an embodiment. At 302, an SCR system (e.g., the SCR system 150) included in the aftertreatment system (e.g., the aftertreatment system 100) receives the exhaust gas. At 304, a reductant insertion assembly (e.g., the reductant insertion assembly 120) receives liquid anhydrous ammonia from a reductant storage tank (e.g., the reductant storage tank 110). At 306, an amount of liquid anhydrous ammonia to be inserted into the SCR system (e.g., the SCR system 150) for optimal decomposition of NOx gases included in the exhaust gas is determined. For example, the dosing control circuitry 174e may be configured to determine an amount of liquid anhydrous ammonia to be inserted into the SCR system 150 for optimal decomposition of NOx gases included in the exhaust gas (e.g., based on an exhaust gas flow rate, an exhaust gas temperature, an engine speed of the engine 10, amount of NOx gases included in the exhaust gas, the ammonia quality, etc.). At 308, a dosing valve included in the reductant insertion assembly is opened for a predetermined time so as to insert the determined amount of liquid anhydrous ammonia into the SCR system (e.g., the SCR system 150). For example, the dosing control circuitry 174e may generate a dosing signal configured to open the dosing valve 128 for a predetermined time so as to insert the determined amount of liquid anhydrous ammonia into the SCR system 150.

At 310, a liquid anhydrous ammonia pressure in the reductant insertion assembly (e.g., the reductant insertion assembly 120) is determined. For example, the pressure determination circuitry 174b may receive a pressure signal from the liquid ammonia pressure sensor 121 and interpret the signal to determine the liquid anhydrous ammonia pressure in the reductant insertion assembly 120. At 312, it is determined if the liquid ammonia pressure exceeds a liquid ammonia pressure threshold. For example, the pressure determination circuitry 174b may determine if the liquid ammonia pressure exceeds the liquid ammonia pressure threshold. If the liquid ammonia pressure is below the liquid ammonia pressure threshold, the method 300 may proceed to operation 318. In response to the liquid ammonia pressure in the reductant insertion assembly (e.g., the reductant insertion assembly 120) exceeding the liquid ammonia pressure threshold, a shutoff valve (e.g., the shutoff valve 122) is closed so as to stop a flow of the liquid anhydrous ammonia into the reductant insertion assembly, at 314. For example, in response to the pressure determination circuitry 174b determining that the liquid ammonia pressure exceeds the liquid ammonia pressure threshold, the valve control circuitry 174d may generate the shutoff valve signal configured to cause the shutoff valve 122 to close so as to stop the flow of the liquid anhydrous ammonia into the reductant insertion assembly 120, as previously described herein.

In some embodiments, in response to the pressure determination circuitry 174b determining that the liquid ammonia pressure exceeds the liquid ammonia pressure threshold, a manual shutoff valve (e.g., the manual shutoff valve 119) may be closed, at 316. For example, if the liquid ammonia pressure in the reductant storage tank 110 exceeds the liquid ammonia pressure threshold, a user may close the manual shutoff valve 119 so as to stop a flow of the reductant from the reductant storage tank 110 to the reductant insertion assembly 120.

In some embodiments, the method 300 also comprises determining an ammonia gas pressure in the reductant insertion assembly (e.g., the reductant insertion assembly 120), at 318. For example, the pressure determination circuitry 174b may also be configured to receive the ammonia gas pressure signal from the ammonia gas pressure sensor 123, and interpret the ammonia gas pressure signal so as to determine the ammonia gas pressure therefrom. At 320, it is determined if the ammonia gas pressure exceeds an ammonia gas pressure threshold. If the ammonia gas pressure is below the ammonia gas pressure threshold, the method 300 may return to operation 316. In response to determining that the ammonia gas pressure exceeds the ammonia gas pressure threshold, the method 300 proceeds to operation 322, and a check valve (e.g., the check valve 124) is opened. For example, in response to the pressure determination circuitry 174b determining that the ammonia gas pressure exceeds the ammonia gas pressure threshold, the valve control circuitry 174d may generate a check valve signal configured to cause the check valve 124 to open so as to vent at least a portion of the ammonia gas and reduce the ammonia gas pressure in the reductant insertion assembly 120.

In still other embodiments, the method 300 may also include determining a flow rate of the liquid anhydrous ammonia in the reductant insertion assembly, at 324. For example, the flow rate determination circuitry 174c may receive a flow rate signal from the flow rate sensor 125, and interpret the flow rate signal to determine the flow rate of the liquid anhydrous ammonia in the reductant insertion assembly 120. At 326, it is determined if the flow rate of the liquid anhydrous ammonia exceeds a predetermined flow rate threshold. If the flow rate of the liquid anhydrous ammonia is below the predetermined flow rate threshold, the method 300 may return to operation 322. In response to determining that the flow rate of the liquid anhydrous ammonia exceeds a predetermined flow rate threshold, an excess flow valve (e.g., the excess flow valve 126) is opened, at 328. For example, in response to determining that the flow rate of the liquid anhydrous ammonia in the reductant insertion assembly 120 exceeds the predetermined flow rate threshold, the valve control circuitry 174d may generate an excess flow valve signal. The excess flow valve signal may be configured to cause the excess flow valve 126 to open so a communicate a portion of the liquid anhydrous ammonia out of the reductant insertion assembly 120 (e.g., back to the reductant storage tank 110), so as to reduce a flow rate and/or a pressure of the reductant in the reductant insertion assembly 120.

Figure 4:
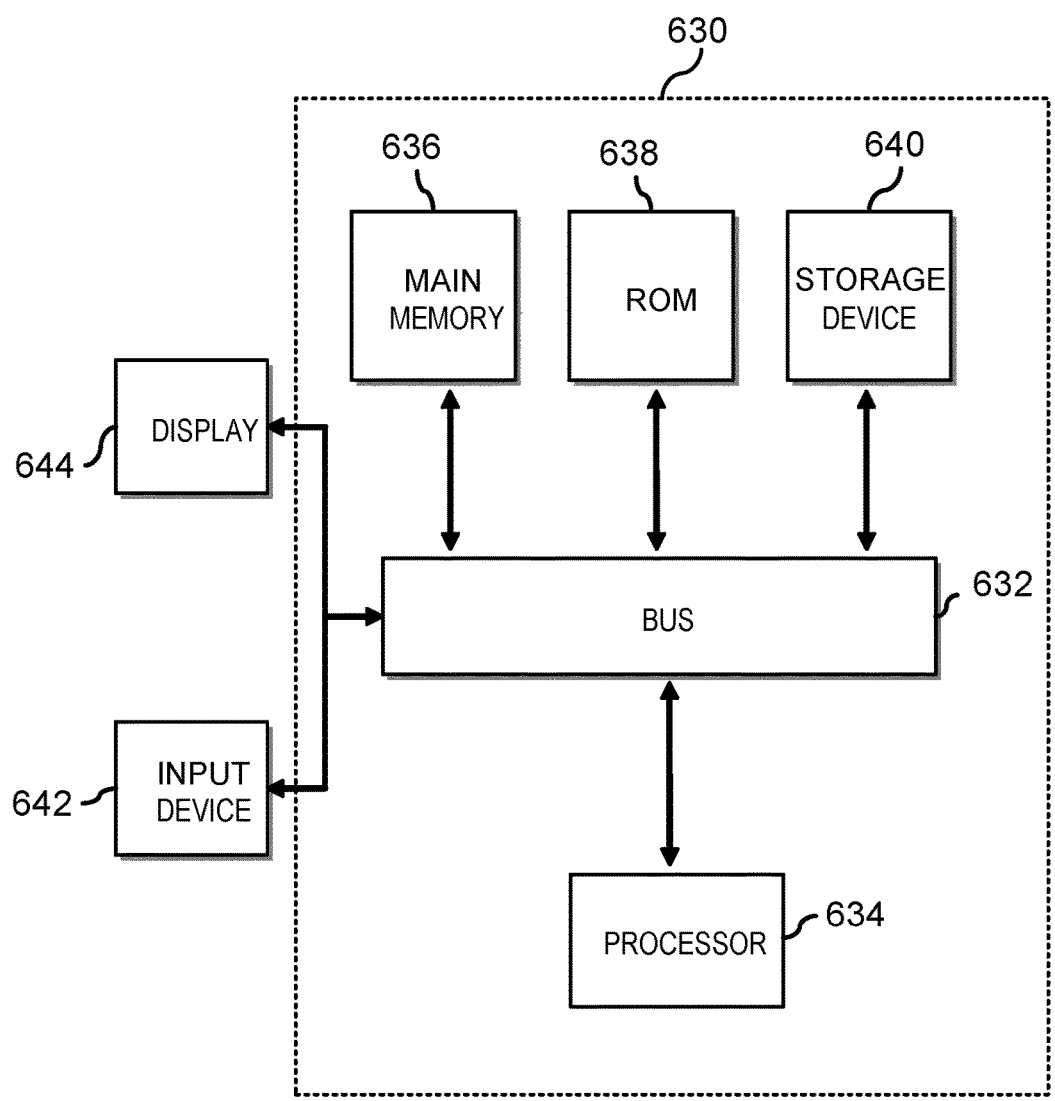
FIG. 4 is a schematic block diagram of a computing device which may be used as the controller shown in FIGS. 1 and/or 2.

In some embodiments, the controller 170, the control circuitry 171, or any of the controllers or control circuitries described herein can comprise a system computer of an apparatus or system which comprises the aftertreatment system 100 (e.g., a vehicle, an engine or generator set, etc.). For example, FIG. 4 is a block diagram of a computing device 630 in accordance with an illustrative implementation. The computing device 630 can be used to perform any of the methods or the processes described herein, for example the method 300. In some embodiments, the controller 170 can comprise the computing device 630. The computing device 630 comprises a bus 632 or other communication component for communicating information. The computing device 630 can also comprise one or more processors 634 or processing circuits coupled to the bus 632 for processing information.

The computing device 630 also comprises main memory 636, such as a random access memory (RAM) or other dynamic storage device, coupled to the bus 632 for storing information and instructions to be executed by the processor 634. Main memory 636 can also be used for storing position information, temporary variables, or other intermediate information during execution of instructions by the processor 634. The computing device 630 may further comprise ROM 638 or other static storage device coupled to the bus 632 for storing static information and instructions for the processor 634. A storage device 640, such as a solid-state device, magnetic disk or optical disk, is coupled to the bus 632 for persistently storing information and instructions. For example, instructions corresponding operations of the method 300 can be stored on the storage device 640.

The computing device 630 may be coupled via the bus 632 to a display 644, such as a liquid crystal display or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 300). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware and software.

Although an example computing device has been described in FIG. 4, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A reductant insertion system for delivering a reductant to a selective catalytic reduction system, comprising:
    a reductant storage tank configured to store a liquid reductant;
    a pressure relief valve operably coupled to the reductant storage tank, the pressure relief valve configured to selectively open in response to a reductant gas pressure of a reductant gas in the reductant storage tank exceeding a predetermined reductant gas pressure threshold; and
    a reductant insertion assembly fluidly coupled to the reductant storage tank and configured to deliver the liquid reductant to the selective catalytic reduction system, the reductant insertion assembly comprising a shutoff valve configured to be selectively closed in response to a liquid reductant pressure exceeding a liquid reductant pressure threshold, so as to stop delivery of the liquid reductant from the reductant storage tank to the reductant insertion assembly.

2. The reductant insertion assembly of claim 1, wherein the liquid reductant has a boiling point of less than −11 degrees Celsius.

3. The reductant insertion assembly of claim 2, wherein the liquid reductant comprises liquid anhydrous ammonia, and wherein the reductant gas comprises ammonia gas.

4. The reductant insertion assembly of claim 1, wherein the pressure relief valve is configured to be fluidly coupled to the selective catalytic reduction system so as to communicate at least a portion of the reductant gas released from the pressure relief valve, when the pressure relief valve is open, to the selective catalytic reduction system.

5. The reductant insertion system of claim 1, further comprising a manual shutoff valve positioned between the reductant storage tank and the reductant insertion assembly, the manual shutoff valve configured to be selectively closed so as to prevent a flow of liquid reductant to the reductant insertion assembly.

6. The reductant insertion system of claim 1, further comprising a liquid level sensor operably coupled to the reductant storage tank, the liquid level sensor configured to determine an amount of liquid reductant contained in the reductant storage tank.

7. The reductant insertion system of claim 1, wherein the reductant storage tank comprises a bladder positioned within an internal volume thereof, the bladder configured to be selectively filled with a fluid so as to expand causing the liquid reductant to be communicated out of the reductant storage tank.

8. The reductant insertion system of claim 1, further comprising a refill valve operably coupled to the reductant storage tank, the refill valve comprising:
    a liquid line configured to deliver the liquid reductant into the reductant storage tank; and
    a vapor line configured to at least one of deliver reductant gas into or allow reductant gas to exit from into the reductant storage tank so as to equalize a partial pressure of the reductant gas and a partial pressure of the liquid ammonia in the reductant storage tank.

9. The reductant insertion system of claim 1, wherein the reductant insertion assembly comprises a check valve configured to be selectively opened in response to a reductant gas pressure in the reductant insertion assembly exceeding a reductant gas pressure threshold.

10. The reductant insertion assembly of claim 1, wherein the reductant insertion assembly further comprises an excess flow valve configured to be selectively opened in response to a flow rate of the liquid reductant in the reductant insertion assembly exceeding a predetermined flow rate threshold.

11. The reductant insertion assembly of claim 1, further comprising a dosing valve configured to be selectively opened so as to insert a predetermined amount of the liquid reductant into the selective catalytic reduction system.

12. The reductant insertion assembly of claim 1, further comprising a reductant delivery line fluidly coupling the reductant storage tank to the reductant insertion assembly, the reductant delivery line having dimensions configured to limit a liquid reductant mass within the reductant delivery line to less than 300 grams.

13. An aftertreatment system for treating an exhaust gas produced by an engine, the aftertreatment system comprising:
a selective catalytic reduction system;
a reductant storage tank configured to store a liquid reductant;
a pressure relief valve operably coupled to the reductant storage tank, the pressure relief valve configured to selectively open in response to a reductant gas pressure of a reductant gas in the reductant storage tank exceeding a predetermined reductant gas pressure threshold;
a reductant insertion assembly fluidly coupled to the reductant storage tank and the selective catalytic reduction system, the reductant insertion assembly comprising a shutoff valve; and
a controller communicatively coupled to the reductant insertion assembly, the controller configured to:
determine a liquid reductant pressure in the reductant insertion assembly; and
selectively close the shutoff valve in response to the liquid reductant pressure in the reductant insertion assembly exceeding a liquid reductant pressure threshold so as to stop a flow of the liquid reductant into the reductant insertion assembly.

14. The aftertreatment system of claim 13, wherein the liquid reductant comprises liquid anhydrous ammonia, and wherein the reductant gas comprises ammonia gas.

15. The aftertreatment system of claim 13, further comprising a manual shutoff valve positioned between the reductant storage tank and the reductant insertion assembly, the manual shutoff valve configured to be selectively closed so as to prevent a flow of the liquid reductant into the reductant insertion assembly.

16. The aftertreatment system of claim 13, wherein the reductant storage tank comprises a bladder positioned within an internal volume thereof, the bladder configured to be selectively filled with a fluid so as to expand and expel the liquid reductant out of the reductant storage tank.

17. The aftertreatment system of claim 13, further comprising a refill valve operably coupled to the reductant storage tank, the refill valve comprising:
a liquid line configured to deliver the liquid anhydrous ammonia into the reductant storage tank; and
a vapor line configured to at least one of deliver reductant gas into, or allow reductant gas to exit from into the reductant storage tank so as to equalize a partial pressure of the reductant gas and a partial pressure of the liquid ammonia in the reductant storage tank.

18. The aftertreatment system of claim 13, wherein the reductant insertion assembly comprises a check valve, and wherein the controller is further configured to:
determine a reductant gas pressure in the reductant insertion assembly; and
selectively open the check valve in response to the reductant gas pressure exceeding an ammonia gas pressure threshold.

19. The aftertreatment system of claim 13, wherein the reductant insertion assembly further comprises an excess flow valve, and wherein the controller is further configured to:
determine a flow rate of the liquid reductant into the reductant insertion assembly; and
open the excess flow valve in response to the flow rate exceeding a predetermined flow rate threshold.

20. The aftertreatment system of claim 13, wherein the reductant insertion assembly further comprises a dosing valve fluidly coupled to the selective catalytic reduction system, and wherein the controller is further configured to:
determine an amount of the liquid reductant to be inserted into the selective catalytic reduction system for optimal decomposition of NOx gases included in the exhaust gas; and
open the dosing valve for a predetermined time so as to insert the determined amount of liquid reductant into the selective catalytic reduction system.

21. A method for decomposing constituents of an exhaust gas flowing through an aftertreatment system, the method comprising:
receiving, by a selective catalytic reduction system included in the aftertreatment system, the exhaust gas;
receiving, by a reductant insertion assembly from a reductant storage tank included in the aftertreatment system, a liquid reductant stored in the reductant storage tank;
determining an amount of the liquid reductant to be inserted into the selective catalytic reduction system for optimal decomposition of NOx gases included in the exhaust gas;
opening a dosing valve of the reductant insertion assembly for a predetermined time so as to insert the determined amount of the liquid reductant into the selective catalytic reduction system;
determining a liquid reductant pressure in the reductant insertion assembly; and
closing a shutoff valve included in the reductant insertion assembly in response to the liquid reductant pressure in the reductant insertion assembly exceeding a liquid reductant pressure threshold, so as to stop a flow of the liquid reductant into the reductant insertion assembly.

22. The method of claim 21, wherein the liquid reductant comprises liquid anhydrous ammonia, and wherein the reductant gas comprises ammonia gas.

23. The method of claim 21, wherein a manual shutoff valve is positioned between the reductant storage tank and the reductant insertion assembly, and wherein the method further comprises closing the manual shutoff valve in response to the liquid reductant pressure exceeding the liquid ammonia pressure threshold.

24. The method of claim 21, wherein the reductant insertion assembly comprises a check valve, and wherein the method further comprises:
determining a reductant gas pressure in the reductant insertion assembly; and
opening the check valve in response to the reductant gas pressure exceeding a reductant gas pressure threshold.

25. The method of claim 21, wherein the reductant insertion assembly further comprises an excess flow valve, and wherein the method further comprises:
determining a flow rate of the liquid reductant into the reductant insertion assembly; and opening the excess flow valve in response to the flow rate exceeding a predetermined flow rate threshold.

* * * * *